United States Patent [19]
Taylor, IV et al.

[11] Patent Number: 5,018,295
[45] Date of Patent: May 28, 1991

[54] ROLLER PURSE RING

[76] Inventors: Harry W. Taylor, IV, 1248 Walnut Tree La., El Cajon, Calif. 92021; Andrew Castagnola, 3851 Bandini, San Diego, Calif. 92110

[21] Appl. No.: 410,849

[22] Filed: Sep. 22, 1989

[51] Int. Cl.$^5$ .............................................. A01K 73/12
[52] U.S. Cl. ........................................................ 43/14
[58] Field of Search ............... 43/8, 14; 292/106, 108, 292/82.21; 403/327, 330; 59/85, 89, 93; 24/600.2, 600.1, 573.5

[56] References Cited

U.S. PATENT DOCUMENTS

| | | | |
|---|---|---|---|
| 2,570,285 | 10/1951 | Sundberg | 43/8 |
| 3,158,951 | 12/1964 | Lewis | 43/14 |
| 3,962,811 | 6/1976 | Buschini | 43/8 |
| 4,736,541 | 4/1988 | Serba | 43/8 |

FOREIGN PATENT DOCUMENTS

| | | | |
|---|---|---|---|
| 83217 | 1/1954 | Norway | 43/14 |
| 103610 | 1/1964 | Norway | 43/14 |
| 442778 | 6/1975 | U.S.S.R. | 43/14 |

*Primary Examiner*—Kurt Rowan
*Attorney, Agent, or Firm*—Charles C. Logan, II

[57] ABSTRACT

A pursing ring used by fishing boats and ships that purse fishing nets up to a mile in length. The purse ring has a roller that cuts down on friction and wear on the cable passing through the purse ring. The purse ring has structure which allows the cable to be laterally passed through one of the arms of the purse ring rather than threading it through its closed loop structure.

6 Claims, 2 Drawing Sheets

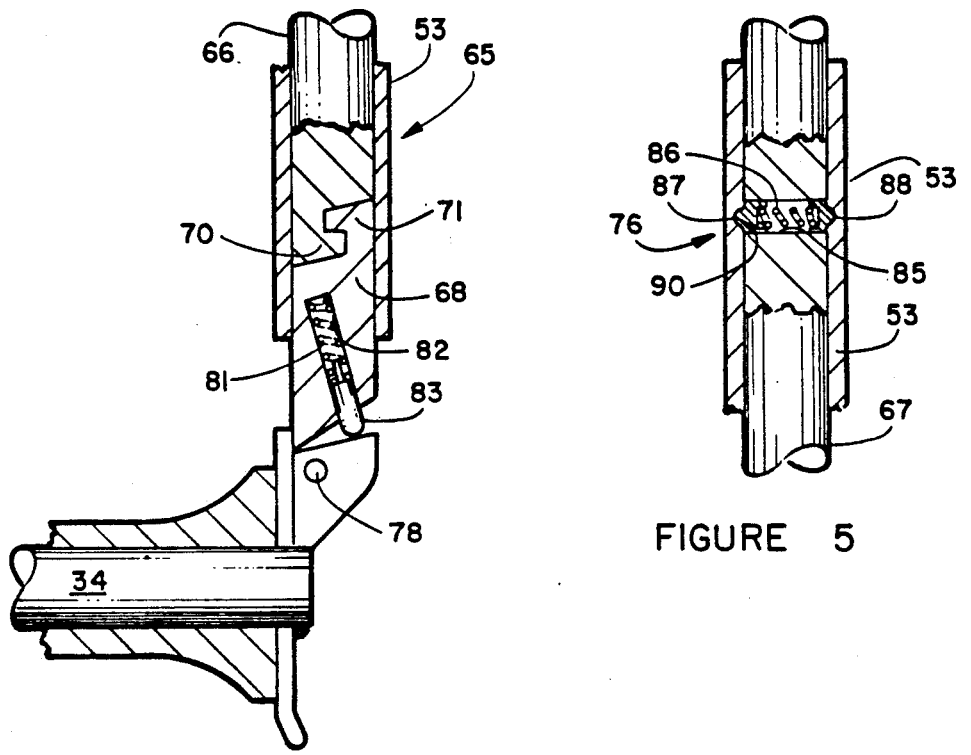
FIGURE 4
FIGURE 5
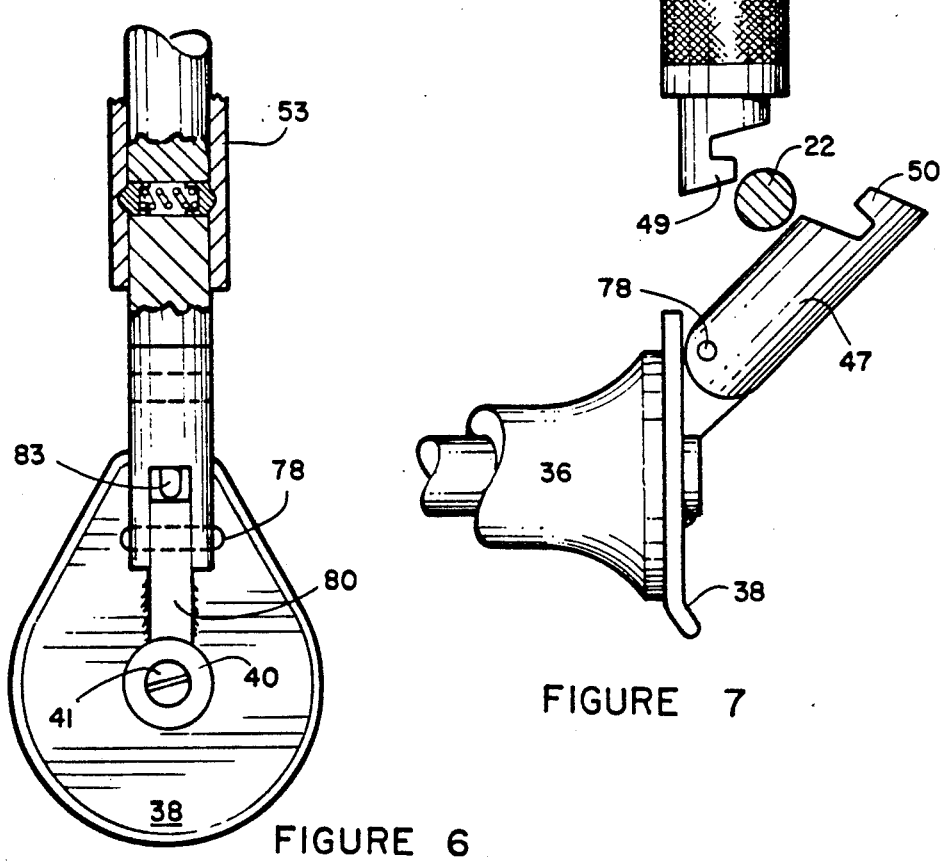
FIGURE 6
FIGURE 7

ROLLER PURSE RING

BACKGROUND OF THE INVENTION

The invention relates to fishing nets and more particularly to purse seines.

For many years it has been the common practice to secure a series of plain rings along the lower edge of a purse seine, and pass a purse line through these rings. This purse line is operatively connected at its ends to suitable winding or pulling mechanism such as winches so that the bottom of the seine may be drawn together or closed when desired. It is not unusual for more than a hundred of these rings to be used on a seine of commercial size.

One of the problems that has existed in the practice of using plain rings is that the frictional drag on the line running through this series of rings is very great. It imposes a tremendous load on the winches and unduly increases the difficulty of properly reeling in the seine. Moreover, the friction frequently wears through some of the rings, thus rendering them useless and it also produces excessive wear on the line. This presents a serious problem, where, as in recent years, extensive use has been made of steel cable, which are relatively expensive.

It is also important that the purse line be reeled in quickly in order to close the bottom of the net as quickly as possible. Any excessive delays or problems that produce interruptions in reeling in the line allows some of the netted fish to escape.

It is an object of the invention to provide a novel roller purse ring which is simple and rugged in construction and which shall tend to be "no-fouling", that is to say, shall be entirely free from any sharp edges or projections on which the line or net might catch or become entangled or cut.

It is also an object of the invention to provide a novel purse ring that has a roller journaled adjacent its bottom end that reduces frictional drag on the line running through the series of purse rings.

It is another object of the invention to provide a novel roller purse ring that has structure which allows the purse line to be laterally inserted into and laterally removed therefrom instead of having to thread it through the closed loop configuration of the ring.

It is a further object of the invention to provide a novel roller purse ring that is economical to manufacture and market.

SUMMARY OF THE INVENTION

Applicant's novel roller purse ring has been designed for use by commercial fisherman. In some instances the net the roller purse rings are used on have a length as great as 5000 feet. Cork floats are attached to the top edge of the net and a series of bridles are attached to the bottom end of the net along its entire length. These bridles have a common ring secured to their bottom ends and a rope sling is attached thereto and extends downwardly therefrom. A rope sling would be attached to the top end of applicant's novel roller purse ring. A purse line or cable that may be as much as one inches in diameter passes through the novel purse rings and passes over the roller journaled in its bottom end. The annular concave surface of the roller functions to self align the cable to the center of the roller as it is being reeled therethrough.

With the novel structure of applicant's purse ring, it is not necessary to thread the cable through the purse ring. It is only necessary to slide the locking sleeve longitudinally along one of the arms of the purse ring so that its swivel arm portion can be rotated away from its stationary arm portion. This will provide a gap of sufficient size that will allow the cable to be laterally inserted and removed from the purse ring. Often there would be over 100 of the roller purse rings attached to the bottom of the net and the net itself could weigh as much as 25 tons or more even before the weight of the fish capture is figured into the total weight to be winched up on to the ship. The use of the rollers in the purse ring drastically reduces the frictional load on the winch thereby allowing the bottom of the net to be closed much quicker. Also the annular concaved surface of the rollers aids to reduce frictional wear on the purse cable and also on the purse rings themselves.

DESCRIPTION OF THE DRAWINGS

FIG. 4 is a partial front cross sectional view of a first alternative embodiment of the roller purse ring;

FIG. 5 is a partial cross sectional view of a first alternative structure for the locking sleeve mechanism;

FIG. 6 is a side elevation view of the structure illustrated in FIG. 4; and

FIG. 7 is a partial front elevation view of the alternative embodiment structure illustrated in FIG. 4.

DESCRIPTION OF THE PREFERRED EMBODIMENT

Applicant's novel roller purse ring will now be described by referring to FIGS. 1-7 of the drawings. The purse ring is generally designated numeral 10.

Figure 1:
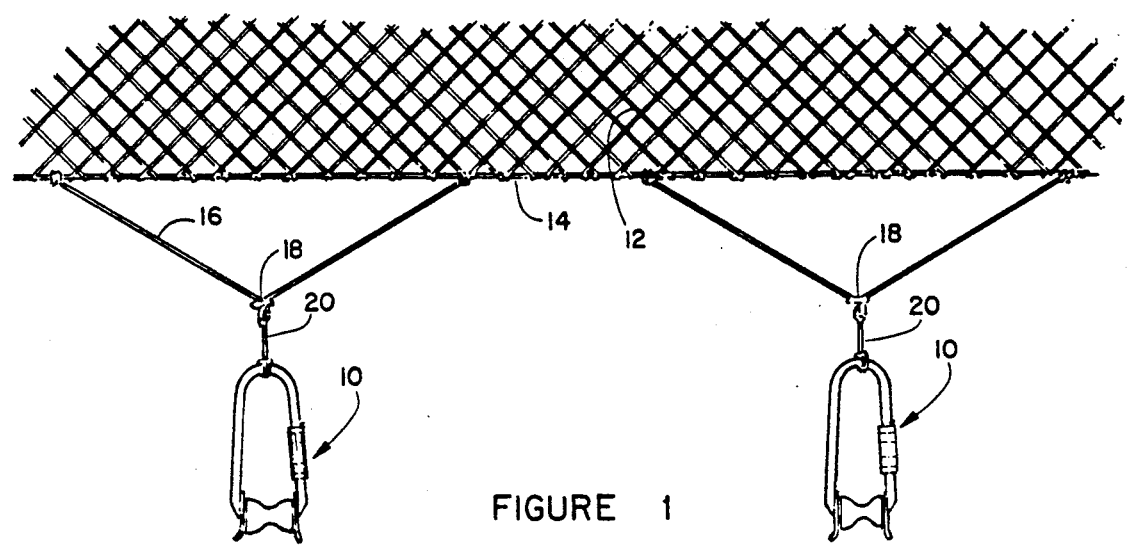
FIG. 1 is a partial side elevation view of a fishing net illustrating how the novel roller purse rings are attached to its bottom.
Figure 2:
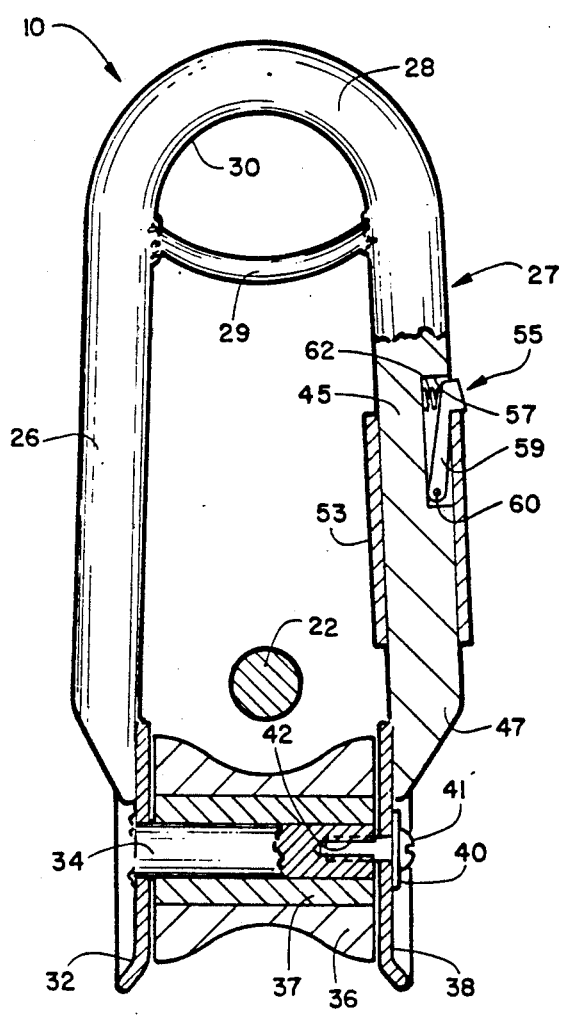
FIG. 2 is a front elevation view of the novel roller purse ring having portions broken away.
Figure 3:
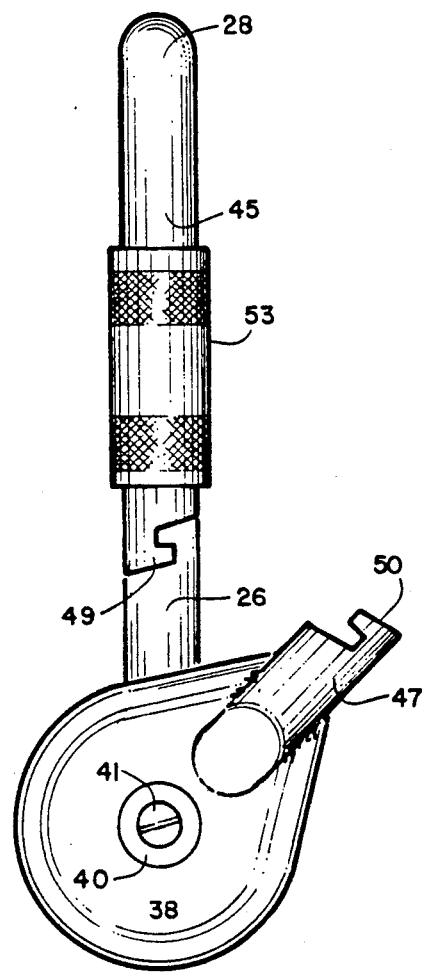
FIG. 3 is a side elevation view illustrating the swivel arm portion pivoted to its open position.

In FIG. 1, the environment for using the roller purse ring 10 is illustrated. A net 12 having a chain or lead line 14 is illustrated having a plurality of bridles 16 attached thereto at spaced intervals. A ring 18 is secured to the bottom end of each bridle 16 and a sling 20 passes through ring 18. A roller purse ring 10 is then attached to each of the rope slings 20 and a purse line or cable 22 is passed through each of the roller purse rings.

Roller purse ring 10 has a pair of laterally spaced arms 26 and 27 that have their top ends connected together by a curved loop member 28. A bar 29 has its opposite ends welded to the respective top ends of arms 26 and 27 to form a holding eye 30 through which sling 20 is secured. A cheek plate 32 is welded to the bottom end of arm 26. One end of pin 34 is also welded to cheek plate 32. A roller 36 having an annular concave surface is journaled on pin 34. A cheek plate 38 is welded to the bottom end of arm 27 and it is removably received on neck portion 39 of pin 34. A washer 40, locking screw 41 and threaded bore 42 are used to secure cheek plate 38 to pin 34.

Arm 27 has a stationary arm portion 45 and a swivel arm portion 47. Interlocking fingers 49 and 50 of the respective stationary arm portion and swivel arm portion provide a rigid structure in their closed position. A locking sleeve 53 prevents them from separating from each other. A locking mechanism 55 which is actuated in order to move the locking sleeve 53 upwardly is mounted in a recess 57 formed in stationary arm portion 45. An elongated safety latch 59 has its bottom end pivotally secured by a pin 60 and a spring 62 biases safety latch 59 to its outer position where it restricts the upward travel of locking sleeve 53.

An alternative two part arm 65 is illustrated in FIGS. 4, 6 and 7. Stationary arm portion 66 and swivel arm portion 68 have mating fingers 70 and 71 that interlock together. Locking sleeve 53 could have an alternative locking mechanism 76 such as is illustrated in FIG. 5. Swivel arm portion 68 has a clevis structure formed at its bottom end that is connected by a pin that also passes through mounting arm 80. Swivel arm portion 68 is biased to its normal upright position by a spring 81 captured in cylindrical recess 82 that has a cylindrical end cap 83 on its outer end.

Locking mechanism 76 is best illustrated in FIG. 5. It shows a bore hole 85 in stationary arm portion 67. A spring 86 is mounted therein and it has cylindrical end caps 87 and 88 on each of its respective ends. They are normally spring biased into an annular groove 90 formed on the inner surface of locking sleeve 53.

What is claimed is:

1. A roller purse ring comprising:

a pair of laterally spaced longitudinally extending arms that extend substantially in the same direction, said arms each having a top end and bottom end;

a curved loop member having its opposite ends connected to the respective top ends of said arms to form a closed loop configuration to which a rope sling may attached;

a laterally extending pin having a first end and an second end;

a roller journaled on said pin;

a first cheek plate rigidly mounted on the bottom end of one of said longitudinally extending arms, the first end of said pin being rigidly connected to said first cheek plate;

said other longitudinal extending arm having a stationary arm portion at its top end and a swivel arm portion at its bottom end, said arm portions having interlocking fingers formed adjacent one of their respective ends;

the bottom end of said swivel arm portion being rigidly connected to a second cheek plate;

means pivotally connecting said second cheek plate to the second end of said pin so that said swivel arm portion may be pivoted about said pin thereby disengaging said respective interlocking fingers so that a cable can be laterally passed through the open space that has been provided for; and a tubular locking sleeve that reciprocally slides over said interlocking fingers.

2. A roller purse ring as recited in claim 1 further comprising a laterally extending bar having a pair of opposite ends that are connected to said respective arms adjacent their top ends to form with said curved loop member a holding eye to which a rope sling may be secured.

3. A roller purse ring as recited in claim 1 further comprising means for detachably removing said roller from said pin.

4. A roller purse ring as recited in claim 1 wherein said roller has an annular concave surface.

5. A roller purse ring as recited in claim 1 wherein said arms and curved loop member are integrally formed of metal material.

6. A roller purse ring as recited in claim 1 further comprising means for locking said locking sleeve in its closed position.

* * * * *